E. C. CAPPER.
GOGGLES.
APPLICATION FILED AUG. 10, 1920.
1,386,989. Patented Aug. 9, 1921.
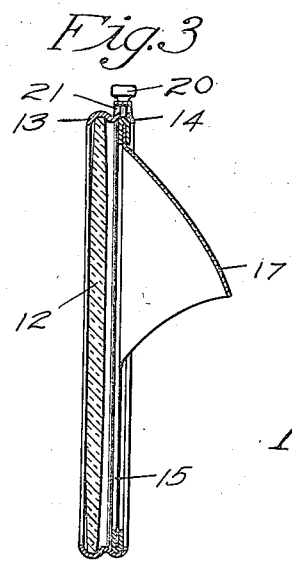
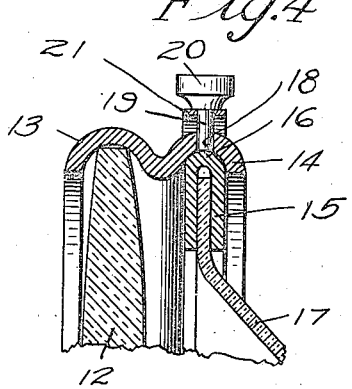
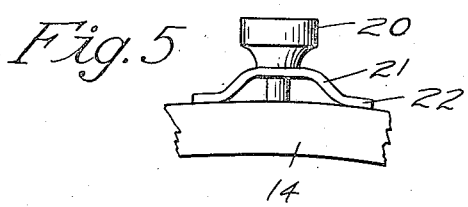
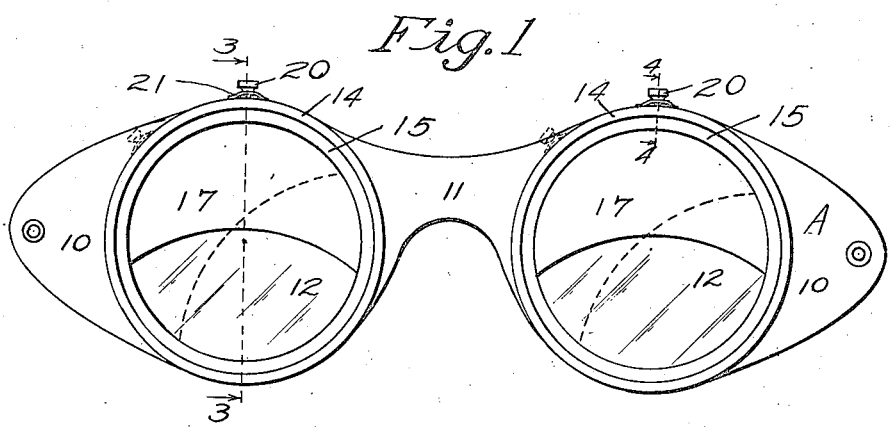
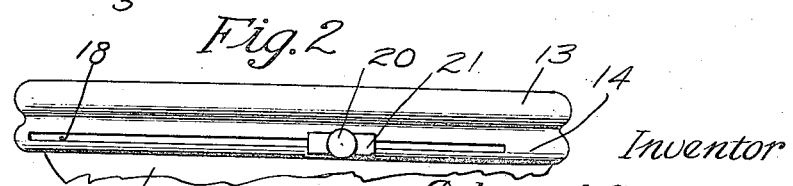
Inventor
Edward C. Capper
By Bair & Freeman Attorneys
Witness

UNITED STATES PATENT OFFICE.

EDWARD C. CAPPER, OF PROSPER, MINNESOTA.

GOGGLES.

1,386,989.

Specification of Letters Patent.

Patented Aug. 9, 1921.

Application filed August 10, 1920. Serial No. 402,580.

*To all whom it may concern:*

Be it known that I, EDWARD C. CAPPER, a citizen of the United States, and a resident of Prosper, in the county of Fillmore and State of Minnesota, have invented a certain new and useful Improvement in Goggles, of which the following is a specification.

The object of my invention is to provide a pair of goggles, having translucent portions thereon, so that the glaring light may be protected from the eyes, the parts being of simple, durable and inexpensive construction.

More particularly it is my object to provide in combination with a pair of goggles a shade of translucent material, which is capable of adjustment to various positions, so that the glaring light or sun may be shaded from the eyes, the adjustability of the translucent material making it possible to shade the eyes either from the left or the right or the top.

Still a further object is to provide in such a device a pair of goggles, having transparent eye glasses therein and a translucent shade adapted to cover a portion of the transparent material, the translucent shades being capable of adjustment to various positions, and yielding means provided for locking and holding the translucent material in any of its desired positions.

In this connection, it will be understood that in driving a car in the evening, the light of an advancing car will glare or shine directly against the eyes of the driver of a car and practically blind him, so that it is almost impossible for him to advance. With my goggles, the device may be so arranged by adjusting the translucent material portions to the positions where the glaring light will not directly strike the eyes of the driver, yet the driver will be capable of having a clear vision of the road through the eye glass portions that are not covered by the shades.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a front elevation of my improved goggles, the translucent shades being shown in dotted lines in one of their adjusted positions.

Fig. 2 shows a top view of one of the eye pieces.

Fig. 3 shows a sectional view taken on the line 3—3 of Fig. 1.

Fig. 4 shows an enlarged, detail, sectional view taken on the line 4—4 of Fig. 1.

Fig. 5 shows an enlarged, detail view of the means for holding the shades in any of their positions.

In the accompanying drawings, I have used the reference character A to indicate the ordinary pair of goggles, which is composed of the two sides 10 and the nose piece 11.

It will be understood that in some types of goggles, the portions 10 and 11 are made of celluloid, while in others it may be made of leather or cloth.

Fixed in the goggles A are the two eye glass pieces 12, which are mounted in the rims 13. The eye glass pieces 12 are of ordinary transparent material and are used to prevent dust from entering the eyes of the driver of the car.

Each of the rims 13 are provided on their forward side with a curved rim 14, in which is received the ring 15. The ring 15 is bent upon itself at 16, so as to provide two adjacent flanges. Received between the flanges so formed is the translucent shade member 17. The shade members 17 are curved outwardly and forwardly, as illustrated in Figs. 3 and 4 of the drawings.

Each of the rims 14 are provided with an elongated slot 18 through which is extended the pin 19. The pin 19 has formed on its upper end a head 20. The lower end of the pin 19 is fixed to the ring 15. A spring clip 21 is provided, which has its ends 22 resting against the upper edge of the rim 14 and over the slot 18.

The center of the spring clip 21 is provided with an opening through which is extended the pin 19. The upper center surfaces of the spring clip 21 rests against the under side of the head 20, and thus yieldingly holds the ring 15 yieldingly against the rim 14.

From the construction of the parts just described, it will be seen that the pin 19 is free to travel in the slot 18. When the pin 19 is moved within the slot 18, it will cause the translucent shade members 17 to be moved so that they will cover a different portion of the eye glass portions 12, substantially as is shown in dotted lines in Fig. 1 of the drawings.

The spring clip 21 will tend to normally hold the translucent shade members 17 in any position that they are moved to.

When driving in the evening and it is desired to use the shades to prevent the glaring light of other vehicles, as they are approaching, the shades are turned to the left or adjusted to meet the requirements. This will permit the operator or driver of the car to have a clear vision of the road itself, which he can see by looking through the remaining portions of the eye glasses 12.

When driving in the daytime, and it is desired to prevent the sun from shining into the eyes, the sun coming from the left, the operator moves the shade members to the left, so that the sun will be prevented from shining into his eyes, or if the sun is directly ahead of the driver the shades are moved to position shown in solid lines in Fig. 1 of the drawings.

The advantages of my goggles are that I am able to readily and easily adjust the shade members to various positions without interfering with the goggles or without any necessity of removing them from the head.

Another advantage is the simple method which I use in locking and holding the goggles in any of a plurality of desired positions.

It will be understood that the translucent shade members 17 may be made of ordinary glass, which has been smoked, or celluloid, or any other such material that will prevent glaring light, yet being formed of translucent material.

I preferably make my shade members 17 of translucent material, but it will be understood that I do not desire to limit myself to such material, as my goggles could be made with the shade portions of some stiff material other than translucent material.

Some changes may be made in the arrangement, and combination of the various parts of my goggles, without departing from the essential features and purposes of my invention, and it is my intention to cover by my claims, any modified forms of structure or use of mechanical equivalents, which may be reasonably included within their scope.

I claim as my invention:

1. In combination with a pair of goggles, having rim members thereon, each of said rim members having a portion designed to receive eye glass members, shade members, said rim members each having formed on one edge thereof a second rim member adapted to receive shade members, said shade members being rotatably mounted and capable of rotary movement within said second rim member, and means for limiting the rotary movement of said shade members.

2. In combination with a pair of goggles, having rim members thereon, each of said rim members having a portion designed to receive eye glass members, shade members, said rim members each having formed on one edge thereof a second rim member adapted to receive shade members, said second rim members being provided with slots, a pin fixed to said shade members and extended through said slots, whereby movement of the pin member will cause movement of the shade members.

3. In combination with a pair of goggles having rims therein for receiving eye glass members, a second rim fixed to the edge of said first rim, shade members mounted in an annular ring, said ring received in said second rims, said second rims having slots therein, a pin extended through each of said slots and fixed to said ring, spring clips mounted over said pins for yieldingly holding the ring against the rim for holding the shade member in any of its positions.

4. In combination with a pair of goggles having transparent eye glass members therein, a pair of shade members adapted to cover a portion of said eye glass members, said shade members being mounted so as to permit some rotary movement of the shade members around the eye glass members and on an axis at right angles to the face of the eye glass members for the purpose of their adjustment to cover various portions of said eye glass members.

5. In combination with a pair of goggles having transparent eye glass members therein, a pair of shade members adapted to cover a portion of said eye glass members, said shade members being mounted so as to permit some rotary movement of the shade members around the eye glass members and on an axis at right angles to the face of the eye glass members for the purpose of their adjustment to cover various portions of said eye glass members, and means for yieldingly holding said shade members in any of their desired positions.

6. In combination with a pair of goggles having transparent eye glass members therein, a pair of shade members adapted to cover a portion of said eye glass members, said shade members being mounted so as to permit some rotary movement of the shade members around the eye glass members and on an axis at right angles to the face of the eye glass members for the purpose of their adjustment to cover various portions of said eye glass members, and means for yieldingly holding said shade members in any of their desired positions, the parts being so arranged that either of the shade members may be adjusted and moved independently of the other.

EDWARD C. CAPPER.